(12) United States Patent
Lundy

(10) Patent No.: US 6,964,020 B1
(45) Date of Patent: Nov. 8, 2005

(54) METHOD AND SYSTEM FOR FACILITATING CONSTRUCTION OF A CANNED MESSAGE IN A MICROBROWSER ENVIRONMENT

(75) Inventor: Michael Lundy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 438 days.

(21) Appl. No.: 09/790,956

(22) Filed: Feb. 22, 2001

(51) Int. Cl.[7] .............................................. G06F 15/00
(52) U.S. Cl. ...................................... 715/534; 715/530
(58) Field of Search ................................ 345/713, 712, 345/816, 817, 831, 780, 812, 814, 776, 853, 345/855, 864; 715/53, 534, 530, 531; 340/7.53; 455/466; 709/714, 206

(56) References Cited

U.S. PATENT DOCUMENTS

| | | | | |
|---|---|---|---|---|
| 4,825,464 A | | 4/1989 | Wen ............................ | 379/354 |
| 5,703,571 A | * | 12/1997 | Cannon et al. ............ | 340/7.21 |
| 5,894,506 A | * | 4/1999 | Pinter ...................... | 379/88.23 |
| 6,049,697 A | * | 4/2000 | Scozzarella et al. ....... | 340/7.31 |
| 6,230,020 B1 | * | 5/2001 | Kantola et al. ............. | 455/466 |
| 6,377,965 B1 | * | 4/2002 | Hachamovitch et al. .... | 715/534 |
| 6,430,409 B1 | | 8/2002 | Rossmann ................... | 455/422 |
| 6,473,621 B1 | * | 10/2002 | Heie .......................... | 455/466 |
| 6,519,771 B1 | | 2/2003 | Zenith ........................ | 725/32 |
| 6,529,717 B1 | * | 3/2003 | Blants et al. ............ | 455/186.1 |
| 6,542,170 B1 | * | 4/2003 | Williams et al. ........... | 345/816 |
| 6,564,213 B1 | * | 5/2003 | Ortega et al. .................. | 707/5 |
| 6,727,916 B1 | * | 4/2004 | Ballard ....................... | 345/758 |

\* cited by examiner

*Primary Examiner*—Cao (Kevin) Nguyen

(57) ABSTRACT

A method and system for performing text-entry by facilitating construction of a canned message on a wireless handheld device, the canned message being comprised of at least two canned message segments (i.e., words and/or phrases). A user selects a first canned message segment from a first set of canned message segments displayed on the handheld device. Upon selection of the first caned message segment, the handheld device may display a second set of canned message segments. The second set of canned message segments may have at least one canned message segment that grammatically continues the first canned message segment selected. The user may select a second canned message segment from the second set of canned message segments. A composite of the first canned message and the second canned message may define the canned message.

24 Claims, 6 Drawing Sheets

Deck of Cards

METHOD AND SYSTEM FOR FACILITATING CONSTRUCTION OF A CANNED MESSAGE IN A MICROBROWSER ENVIRONMENT

BACKGROUND OF THE INVENTION

1. Field of the Invention

The present invention relates to telecommunications services and more particularly to a method and system for facilitating construction of a canned message in a microbrowser environment.

2. Description of Related Art

Communication is a basic function of the human race. Society would be unable to function without people being able to communicate with each other. Whether it is for business or for pleasure, communication is essential to our everyday life. Although people have been communicating for over a millennium, the ability to communicate with one another over long distances is a more recent advance. Telecommunications refines the "art and science" of communication.

Telecommunications technology offers people a number of ways to communicate with each other. The wireless handheld device is one of the more popular modes of communication. The wireless handheld device may be a cellular telephone, pager, or personal digital assistant (PDA), for example, that an individual may readily carry to communicate with others. The beauty of such handheld devices is that they facilitate communication between individuals in a variety of ways, for instance, by voice and by text.

The modern handheld device may have a display screen for displaying text and a character-input device for entering characters. The display screen may be, for example, a Liquid Crystal Display (LCD). The character-input device may be, for example, a standard 12-key Dual Tone Multi-Frequency (DTMF) keypad. The advantage of having the display screen and the character-input device on a wireless handheld device is that it facilitates text-based communications.

A. Microbrowser

Only recently has wireless telecommunications sufficiently advanced to permit wireless connectivity over the Internet. Landline-based computers have been used for many years to access the Internet. A more recent development, however, is the ability for wireless handheld devices, to connect to the Internet. The microbrowser is one application that enables a user of a wireless handheld device to exchange instructions with network devices on the Internet. For example, the microbrowser may send instructions to a server to perform functions requested by the user. The microbrowser may also receive instructions from the server that comprise content stored on the server. The method in which a microbrowser communicates with the server typically conforms to a standard protocol. One such protocol is Wireless Application Protocol (WAP).

WAP defines an architecture for exchanging content between a wireless handheld device, a gateway, and a server. WAP typically employs a markup language to facilitate transferring content between the server and the wireless handheld device. A markup language is a set of instructions for instructing the microbrowser to perform a particular function. For example, a markup language may instruct the microbrowser to display text, request user input, or send content to the server. Wireless Markup Language (WML) is the markup language that is compatible with WAP. Other languages, however, that a microbrowser may interpret include Handheld Device Markup Language (HDML) and Compact Hyper-Text Markup Language (cHTML).

"Tags" are generally the instructions of the markup language. Commonly, a "tag document" embodies at least one tag (i.e., instruction). The microbrowser, in conjunction with the gateway, may interpret the tags in the tag document and display the translated document on the display screen. In WML and HDML, a tag document that describes the content of the display screen is typically referred to as a card. If at least one tag document embodies tags describing more than one card, the at least one tag document may be referred to as a "deck of cards." A user may navigate in the microbrowser environment by moving through the deck of cards. The cards may comprise information stored on the server, thus permitting the user to access information resident on the server.

Typically, a card may also be encoded to instruct the microbrowser to program the use of softkeys resident on the handheld device. A softkey is a programmable key that accepts input from the user. The handheld device may have one or two softkeys, typically located below the display screen and under a label (on the display screen), that identifies the function of the softkey. A card may program one of the softkeys as a "primary key"—typically the left key with functionality related to operating the microbrowser. For example, the primary key may be a navigation key, which the user may press to browse to another card.

Conventionally, the microbrowser may assign another softkey (e.g., the "secondary key"—usually the right key) to facilitate generic system (browser) functions. Generic system (browser) functions may include "BACK" for going to the previous card or "CLEAR" for clearing contents on the display screen. Other functions are also possible.

B. Microbrowser Cards

Text-entry cards and choice cards are two common types of cards that the microbrowser may display. Each type of card may be classified according to its function. The text-entry card may be a card for enabling the user of a handheld device to create, modify, or otherwise edit text on the handheld device. The text-entry card may comprise at least one title segment for displaying the title of the card (e.g., text) and at least one text-entry field. A user may enter text in the text-entry field and the microbrowser may then send the text to the server. Other arrangements are also possible.

The choice card is another type of card. Like the text-entry card, the choice card has a title segment, which usually identifies the subject matter of the choice card. The choice card, however, has a choice-list segment in place of, or along with, the text-entry segment. The choice-list segment may have a list of selectable options. Each option, known as a choice-item, is typically accompanied by a corresponding number. The user may select a choice-item on the list by pressing the corresponding number key on the character-input device. Alternatively, the user may use scroll keys to highlight a desired item and then press a softkey to indicate the selected choice-item to the microbrowser. In response, the microbrowser may display another card or to take another designated action associated with the selected item.

Each text-entry card or choice-card is typically encoded with a display block. The display block defines the content of the card viewable on the display screen of the wireless handheld device. For example, the display block of a text-entry card may include a title segment, a text-entry segment, and softkey labels. Similarly, the display block of a choice card may include a title segment, a choice list segment, and softkey labels.

Commonly, all of the content in the display block cannot be viewed at once on the display screen. The display block may have more characters than what may fit on the display screen. To accommodate the limited display screen, the microbrowser may use a concept of a display window. The display window may define the contents of the display block currently viewable on the display screen of the handheld device. For example, the card may be programmed so that initially a portion of the content in the title segment and all or a portion of the content in the choice-item segment are within the display window and thus viewable on the display screen (softkey labels may be always viewable on the display screen regardless of whether they are within the display window). To view portions of the display block not on the display screen (e.g., additional choice-items), the desired contents may be shifted into the display window. A user may use the scroll keys, for example, to shift the contents of the display block into the display window.

C. Text-Entry on Handheld Wireless Devices

A microbrowser facilitates communications on the handheld device. For example, the microbrowser simplifies the process of accessing the Internet, engaging in interactive chat sessions, and/or exchanging messages.

The relatively simple character-input device of typical handheld devices, however, may limit the functionality of the handheld device. The handheld device may have a character-input device comprising a numeric keypad labeled with one or more alphabetic characters (i.e., a 12 key DTMF keypad). For example, the "2" key on a handheld device may be labeled with the letters "A", "B", and "C", the "3" key may be labeled with the letters "D", "E", and "F", and so forth. Such a keypad may be efficient for numeric entry, but deficient for text entry. The keypad may be deficient because, although it does allow for entry of characters (e.g., in a text-entry field), it does not inherently distinguish between the letters associated with a given key. For instance, if a user presses the "2" key, it is unclear whether the user intends to type "A", "B", or "C".

The "triple-tap method" is the most prevalent text-entry method. The triple-tap method is premised on distinguishing between letters on a numeric keypad. According to the triple-tap method, a user may press a numeric key multiple times to indicate the letter that a user wishes to type. For instance, to type the letter "B", a user may press the "2" key twice (since "B" is the second letter on that key), and to type the letter "C", the user may press the "2" key three times (since "C" is the third letter on that key). The advantage of this method is that a user may enter virtually any character string on the handheld device by pressing the associated digits a corresponding number of times.

The "predictive text-entry method" is an improvement over the triple-tap method. Unlike the triple-tap method, the predictive text-entry method may predict the character string that a user wishes to enter on a handheld device. The predictive text-entry method may correlate numbers that the user enters with one or more text strings corresponding to the numbers. For example, if a user enters the numeric string "4-6-6-3" on a standard 12-key DTMF keypad, the predictive text-entry method may determine (using the alphabetic characters labeled on the numeric digits and a dictionary database) that the numeric string corresponds to the text strings (e.g., words) (i) H-O-M-E, (ii) G-O-O-D, (iii) H-O-O-D, (iv) G-O-N-E or (v) H-O-N-E. The microbrowser may then present the list of words as a choice-items on a choice card. The user may select the word that he intended to type. Therefore, the predictive text entry method enables a user to enter text in a handheld device with as few key presses as the number of letters in the text.

SUMMARY

The present invention stems from a realization that difficulty can still exist in entering text strings on a typical wireless handheld device, even if equipped with a microbrowser. Many wireless handheld devices have minimally useful character-input devices. The triple-tap method may facilitate text-entry, but it may require the user to press a large number of keys in order to type a very simple word. The predictive text-entry method may also facilitate text-entry, but it consumes significant resources on the handheld device, typically in the form of searching the dictionary database for valid words. Therefore, it would still be advantageous to have a more robust user-interface to facilitate text-entry on the handheld device.

In accordance with an principal aspect of the present invention, a user-interface for text-entry may display sets of text-strings such that a user may perform text-entry by selecting a text-string from each set. Unlike existing text-entry methods, the user need not enter each character of the text-string. According to an exemplary embodiment, the user interface may display a first set of text-strings on the handheld device. A user may select a first text-string from the first set. In response to the user selecting the first text-string, the user may be presented with second set of text-strings. At least one text-string in the second set may grammatically continue the text-string already selected. The user may then select a second text-string from the second set such that the second text-string grammatically continues the first text-string selected. Thus, a user may perform text-entry of a message by selecting and combining text-strings into a canned message.

The text-strings are referred to herein as canned message segments. Canned message segments may be words like "work" and "home" and phrases like "Meet me at" and "Pick up." The canned message segments may be grouped into sets of canned message segments. Each subsequent set of canned message segments may have at least one canned message segment that grammatically continues an earlier selected canned message segment. For example, if the canned message segment "Meet me at" is selected, the second set of canned message segments may have the words "work", "home", and "school" which grammatically continue the phrase "Meet me at." A user may perform text-entry by selecting the two canned message segments "Meet me at" and "work" in two sets of canned message segments and combining them into a canned message "Meet me at work."

In accordance with another aspect, the text-entry method may involve a server sending sets of canned message segments to the handheld device. The sets of canned message segments may have canned message segments (i.e., text-strings) that grammatically continue an earlier selected canned message segment. Thus, processing associated with constructing canned message segments may move from the handheld device to the server.

Thus, in one respect, an exemplary embodiment of the present invention may take the form of a method for facilitating construction of a canned message. The method may involve displaying a first set of canned message segments, preferably encoded in a choice card, on a display screen. A first canned message segment may be selected from the first set, and a second set of canned message segments may be displayed. The second set, also preferably encoded in a choice card, may have at least one canned message segment grammatically continuing the first canned message segment already selected. A second canned message segment may be selected from the second set such that the composite of the first canned message segment and the second canned message segment defines the canned message. In an alternative embodiment, the composite of the first canned message segment and second canned message segment may be the canned message.

According to another aspect, an exemplary embodiment may take the form of a method for facilitating construction of the canned message. The method may comprise user-entry of a text-string, for example, in a text-entry field of a text-entry card. The text-string may be words or phrases and/or edited canned message segment(s) (including edited composites). A set of canned message segments may be displayed on the display screen in response to the user-entry of the text string. The set of canned message segments may have at least one canned message segment grammatically continuing the text-string.

According to another aspect, an exemplary embodiment may take the form of a network-based method for facilitating construction of a canned message. The method may comprise a first entity, such as a server, sending a first set of canned message segments to a second entity, such as a client device. A first canned message segment may be selected from the first set and, in response, the first entity may send a second set of canned message segments to the second entity. The second set of canned message segments may have at least one canned message segment grammatically continuing the first canned message segment. A second canned message segment may be selected from the second set such that the composite of the first canned message segment and the second canned message segment may define the canned message.

According to another aspect, an exemplary embodiment may take the form of a network-based method for facilitating construction of a canned message. The method may comprise a first entity such as a client device receiving user-entry of a text-string, for example, in a text-entry field of a text-entry card. The text-string may be words or phrases and/or edited canned message segment(s) (including edited composites). A second entity such as a server may then send a set of canned message segment to the first entity. The set may have at least one canned message segment grammatically continuing the text-string.

According to another aspect, an exemplary embodiment may take the form of a system for facilitating construction of a canned message. The system may comprise computer instructions, preferably including microbrowser software, for performing several functions. The functions may include displaying a first set of canned message segments, preferably encoded in a choice card, on a display screen such that a first canned message segment may be selected from the first set. The functions may also include constructing a second set of canned message segments, preferably encoded in a choice card, using grammar rules or grammar sets. The second set of canned message segments may have at least one canned message segment grammatically continuing the first canned message segment. The second set of canned message segments may be displayed on the display screen such that a second canned message segment that grammatically continues the first canned message segment may be selected from the second set. A composite of the first canned message segment and the second canned message segment may define the canned message.

According to another aspect, an exemplary embodiment may take the form of a system for facilitating construction of a canned message. The system may comprise a character-input device for user-entry of a text-string. The text-string may comprise words or phrases and/or edited canned message segment(s) (including edited composites). The system may also comprise computer instructions for displaying a set of canned message segments on the display screen. The set may have at least one canned message segment grammatically continuing the text-string.

According to another aspect, an exemplary embodiment may take the form of a server for facilitating construction of a canned message. The server may comprise computer instructions stored in memory and executable by the processor for outputting a second set of canned message segments, preferable encoded in a choice card. The second set of canned messages segments may have at least one canned message segment grammatically continuing a first canned message segment selected from a first set of canned message segments. A composite of the first canned message segment and the second canned message segment may define the canned message. The server may also comprise computer instructions for constructing the set of canned message segments. For example, the server may use grammar rules or grammar sets to construct the second set of canned messages.

These as well as other aspects and advantages of the exemplary embodiments will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to following figures.

DETAILED DESCRIPTION OF EXEMPLARY EMODIMENTS

1. Exemplary Network Architecture

Figure 1:
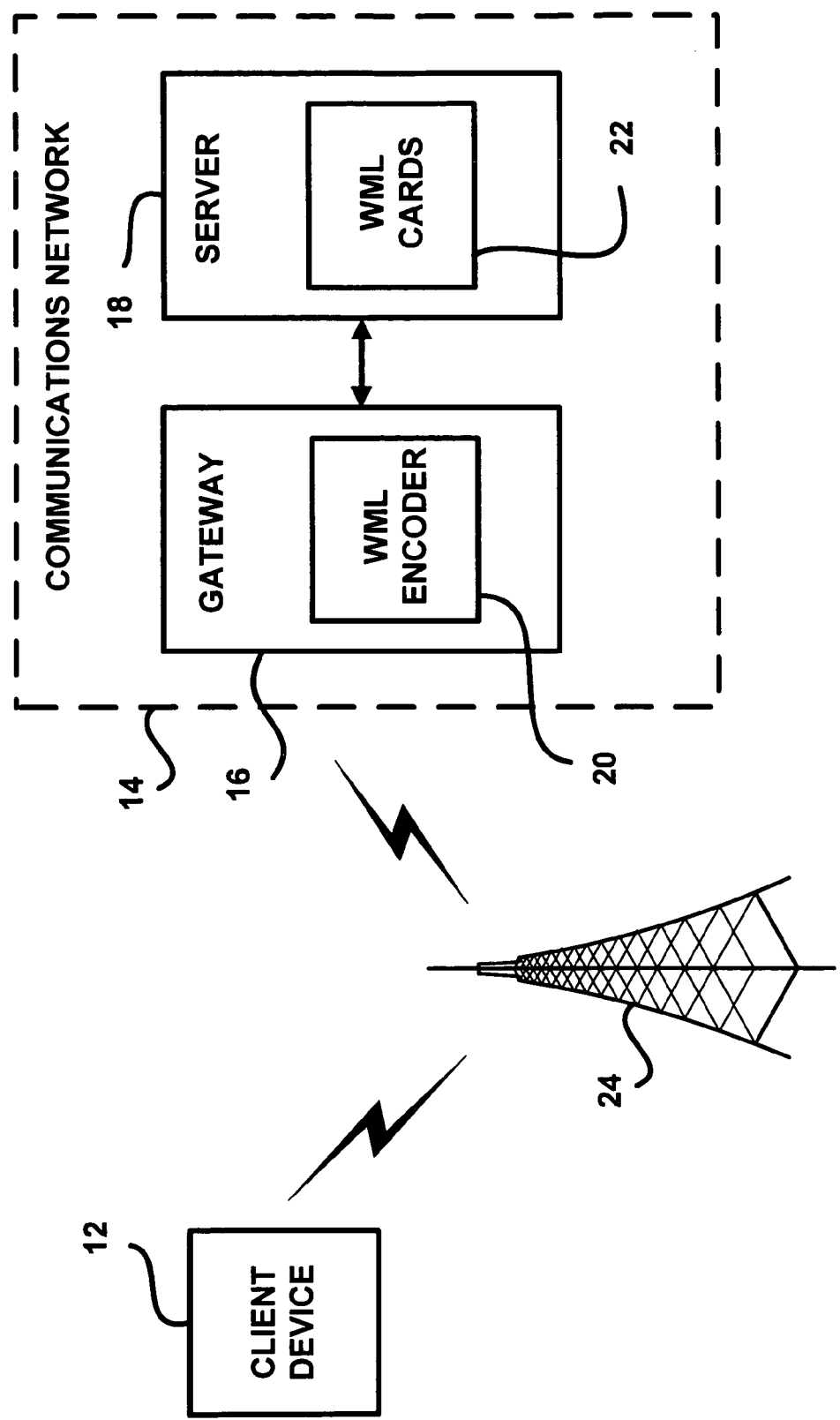
FIG. 1 illustrates a client device and a server configured to communicate over a communications network.

Referring to the drawings, FIG. 1 illustrates the architecture of a communications network in which an exemplary embodiment of the present invention may be employed. FIG. 1 assumes that a client device will run WML in a WAP environment so as to communicate with a server. This and other arrangements described herein are shown for purposes of illustration only.

Those skilled in the art will appreciate that other architectures and other protocols may be used instead, additional elements may be added to these architectures and protocols, and some elements may be omitted altogether. Further, as in most communications applications, those skilled in the art will appreciate that many of the elements described herein may be functional entities implemented as discrete components or in conjunction with other components, in any suitable combination and location. For example, the client device and server may be any type of entity such as a device, machine, or a combination thereof.

Still further, various functions described herein as being performed by one or more devices may be carried out by hardware, firmware, and/or software, such as by a processor executing appropriate computer instructions. Provided with the present disclosure, those skilled in the art can readily prepare the appropriate computer instructions to perform such functions.

The WAP architecture shown in FIG. 1 enables a client device 12 to communicate with a server 18 residing in a communications network 14. The WAP architecture comprises three elements: the client device 12, a gateway 16, and the server 18. The client device 12 is typically a wireless handheld device. It may be, for instance, a cellular telephone, a PDA, or a pager, but it could take other forms as well. For example, the wireless handheld device might not even be a handheld device and it might not even be wireless.

The server 18 is typically a computer residing on a network such as the Internet. It may, however, be a collection of devices on the network that together function as a server 18. The server 18 typically has the ability to communicate with the wireless handheld device 12 via the gateway 16 and a wireless channel 24. The server 18 typically transmits, receives, stores, and creates tag documents that instruct a microbrowser running on the wireless handheld device 12 to display and/or accept input from the user. The tag documents may be written in a markup language such as WML, HDML, or cHTML. For purposes of illustration, however, the exemplary embodiments will assume that WML cards 22 reside on the server 18. Of course other markup languages are possible and those skilled in the art will appreciate that other arrangements (e.g., non-card constructs) may be used instead.

The gateway 16 is the mechanism by which the server 18 and wireless handheld device 12 communicate. The gateway 16 may transmit, via a transmitter circuit or transceiver circuit, for example, WML cards 22 to the wireless handheld device 12. Furthermore, the gateway 16 may receive, via a receiver circuit or transceiver circuit, for example, instructions that instruct the server 18 to perform various operations. A WML encoder 20 may translate the WML cards 22 into a format compatible with wireless transmission. Typically, the WML encoder 20 encodes the WML cards 22 using a binary data format to permit robust, error-free wireless transmission over the wireless channel 24.

Figure 2:
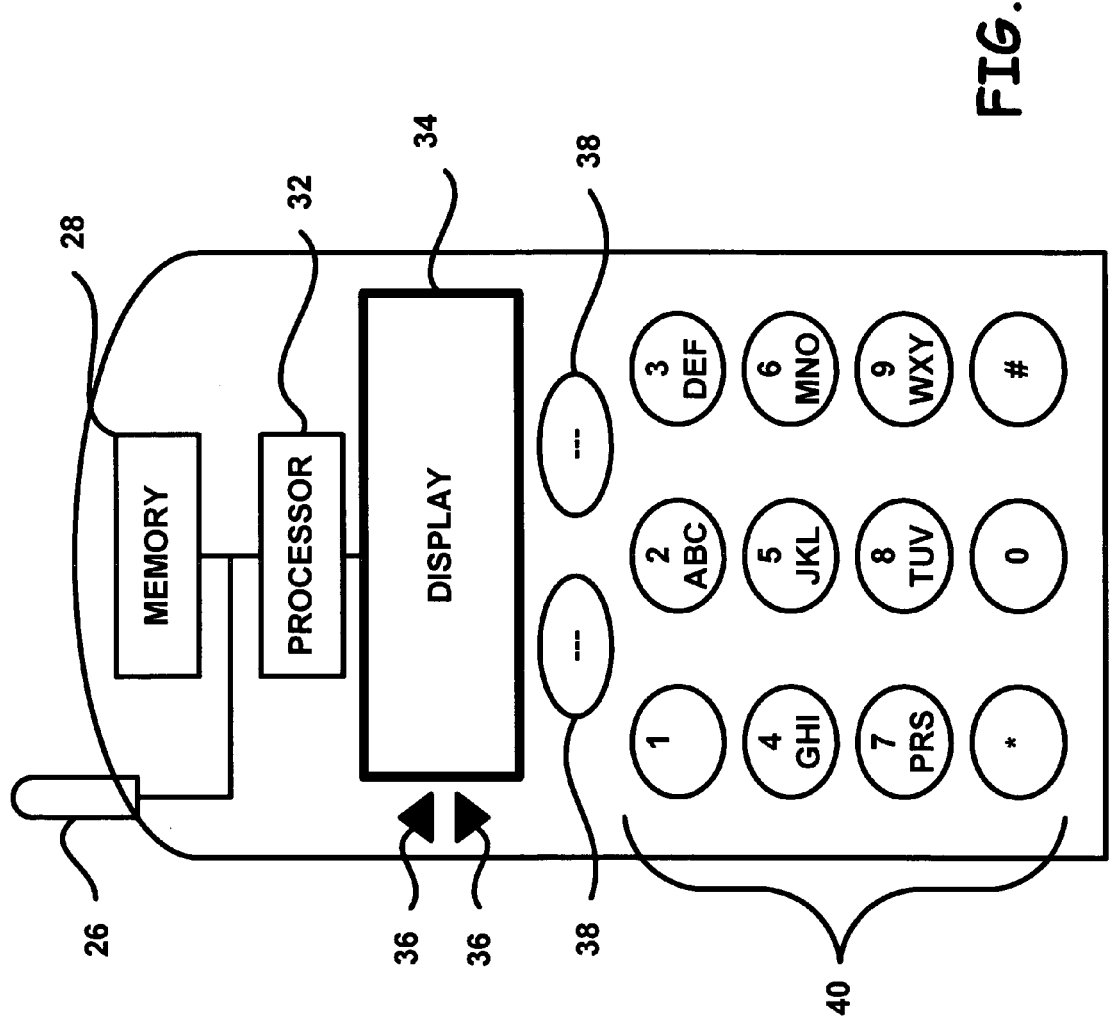
FIG. 2 illustrates a wireless handheld device.

FIG. 2 illustrates a typical wireless handheld device. A handheld device may be, for example, a processor-based device for communicating with the server 18 (FIG. 1). It may comprise a processor 32 coupled to memory 28 and an antenna 26. The processor 32 may execute microbrowser software residing in the memory 28. The antenna 26, along with a transmitter circuit and receiver circuit or a transceiver circuit (all not shown), may carry out the functions of transmitting and receiving over the wireless channel 24 (FIG. 1). Other arrangements are also possible.

The device may also have a display screen 34 and at least one actuator. The display screen 34 may be capable of displaying characters or graphics (e.g., pictorial representations of objects). One actuator may be a character-input device 40 such as a traditional 12 key DTMF keypad, a keyboard, a touch interface, a touch interface with handwriting recognition, a touch interface with virtual character-entry, or a voice recognition system. If the character-input device 40 is a traditional 12-key DTMF keypad, other letters not conventionally found on a numeric character-entry mechanism 40 may be provided on the keypad. For instance, the key for the digit "7" may represent the letter "Q" and the key for digit "9" may represent the letter "Z." Another actuator may be a pair of scroll keys 36 for displaying text that may not fit at once in the viewable area of the display screen 34. Still further, the handheld device may have actuators in the form of softkeys 38 that the user may use to trigger actions by the microbrowser.

2. Construction of Canned Messages

Figure 3:
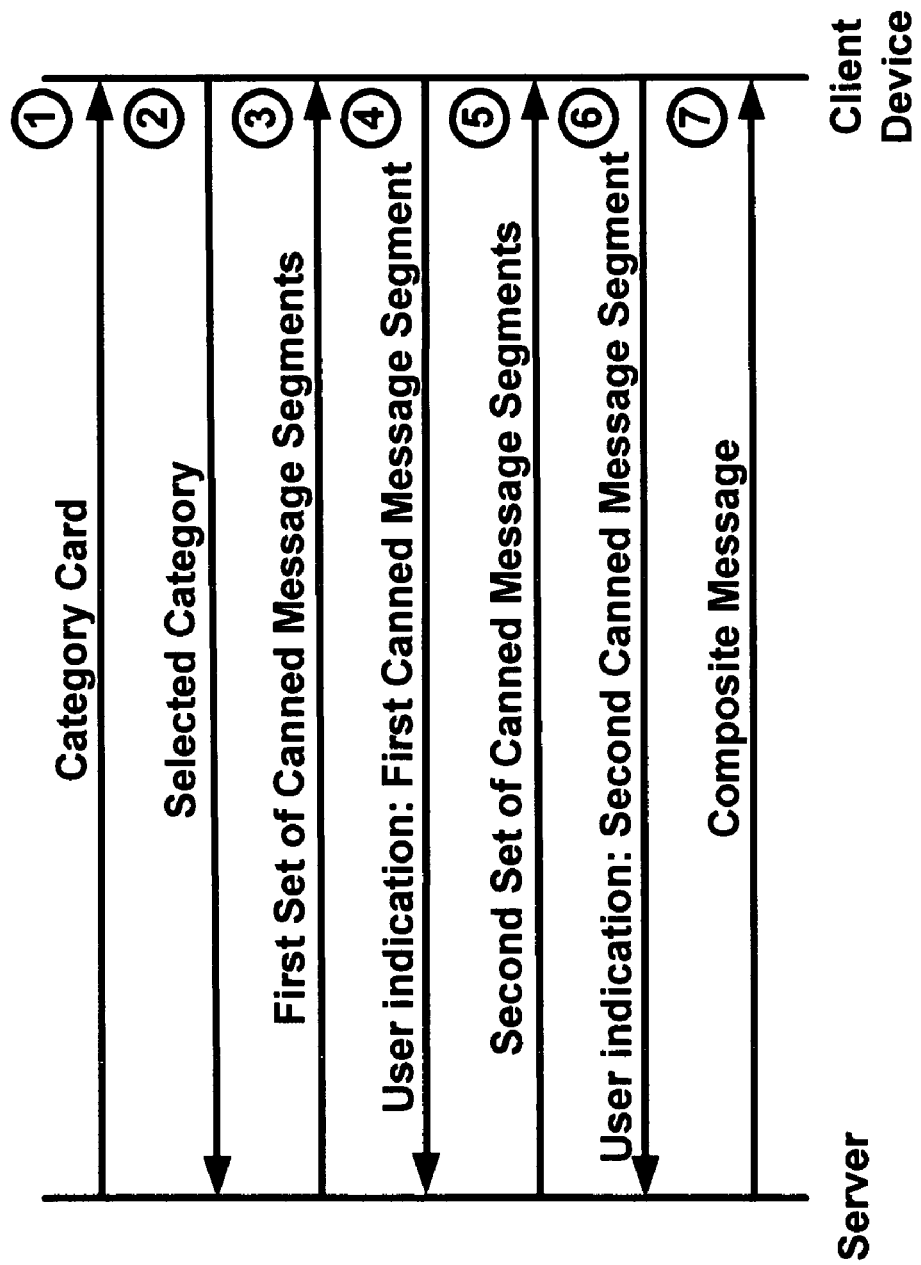
FIG. 3 illustrates server-client communications during the construction of a canned message.
Figure 4:
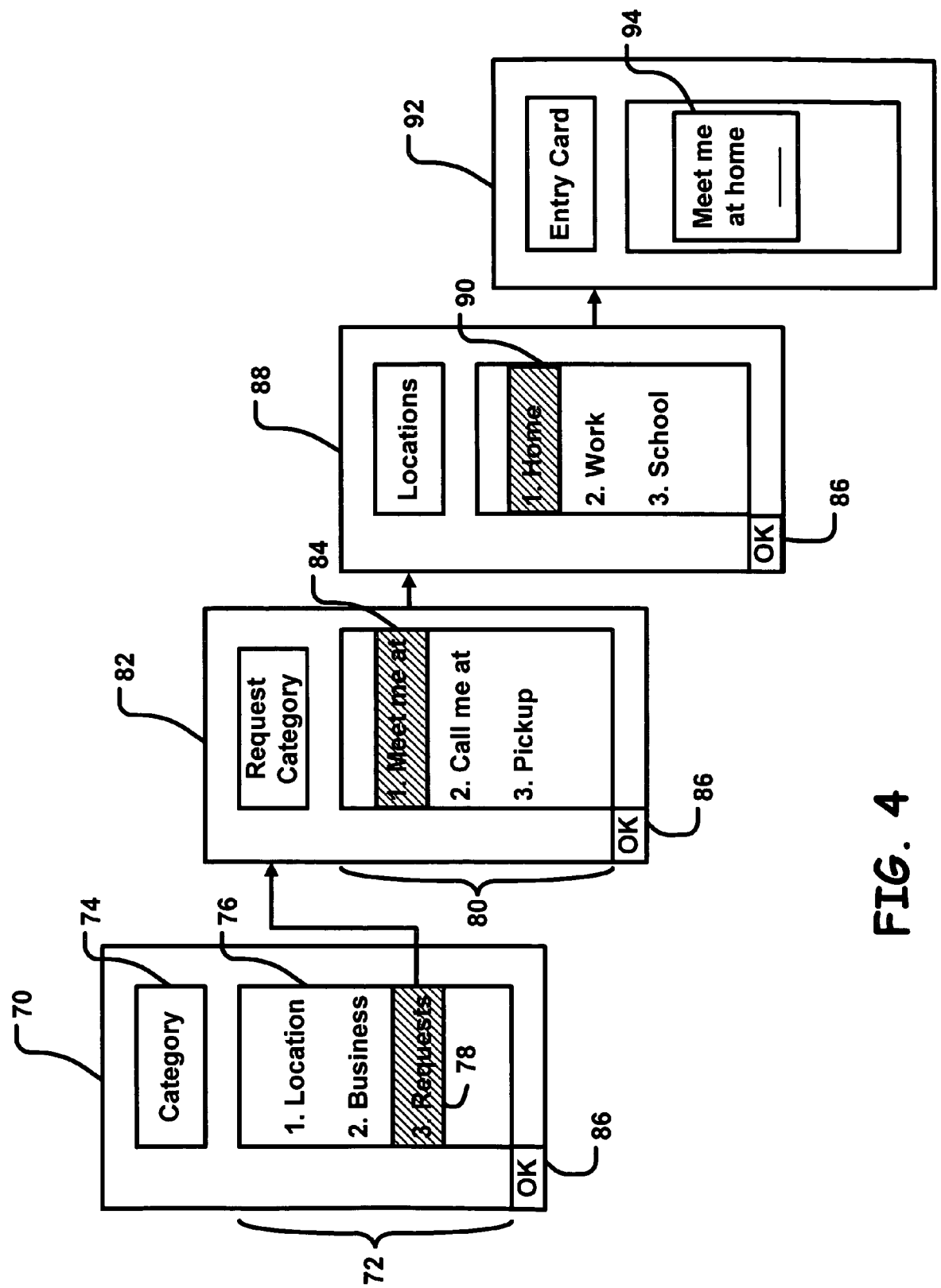
FIG. 4 illustrates choice cards as used during construction of a canned message.

The exemplary embodiments of the present invention provide a method and system for facilitating construction of a canned message. In combination, FIG. 3 and FIG. 4 illustrate an step-by-step approach to exemplary construction of a canned message. FIG. 3 illustrates exemplary communications between a server and client device engaged in the construction of a canned message. FIG. 4 illustrates an exemplary set of choice cards for constructing a canned message. Although FIG. 4 illustrates specific choice cards with specific choice-items, the content of the choice cards is not necessarily limiting. Other choice-items may be displayed consistent with the exemplary embodiment.

As used herein, the term "display" (and variations of that term) means to "present for viewing." In this regard, an object may be "displayed" even if only part of the object may be viewable at a time, provided that the remainder of the object can be viewed as well, e.g., by a user scrolling through the object or moving a sliding window over the object. Thus, for example, a text document or graphic can be "displayed" on a display screen, even though only a portion of the text document or graphic is actually viewable at once, provided that the remainder of it can be viewed as well, through the use of scroll keys, for instance.

According to the exemplary embodiment, the process for facilitating construction of a canned message may begin, at step 1 (FIG. 3), with the client device receiving a Category card, preferably from the server. The Category card may list different types (e.g., categories) of canned messages that the user may construct. The Category choice card may be a WML, HDML, or cHTML card, but other arrangements are also possible.

FIG. 4 illustrates an exemplary Category card 70 in the form of a choice card. The Category card 70 may have a title segment 74 describing the type of card and a choice list segment 76 having exemplary choice-items 72 for constructing canned messages in the following categories:

1. Location
2. Business
3. Requests

Each of the choice items encoded in the Category card 70 may be linked to at least one card encoded with canned message segments for constructing canned messages in the specific category.

The Category card 70 may be encoded to program the microbrowser to display the Category card 70 on the display screen. Thus, the microbrowser may display the Category card 70 on the display screen of the handheld device and then request that the user select a particular category of the canned message to construct. For example, the microbrowser may prompt the user to press a digit associated with the particular category or have the user scroll to the particular item under a highlight and press an OK softkey identified by a label 86. Of course, the exemplary embodiment is not limited in the mechanism for selecting the particular category.

The microbrowser may then receive user-indication that the user has selected a particular category. The user-indication may be represented by a signal from an actuator to the microbrowser indicating that the user has pressed a numeric digit on the character-input device 40. For example, if the user selects the "Request" category 78, the microbrowser may receive the user-indication of the selected category (i.e., the second choice-item) in the form of a digit associated with the selected item or a press of a softkey identifying selection of a highlighted choice item. At step 2 (FIG. 3), the client device may transmit the selected category to a server. For instance, it might transmit a unique code to the server indicating the user's selection to construct a canned message in the form of a request. One skilled in the art may devise other methods for communicating the selection to the server.

A function of the server is to offload the processing associated with constructing a canned message from the handheld device to the server. The server, however, is not necessary for constructing a canned message. In an alternative exemplary embodiment, the functions of the server may be performed directly on the handheld device. The exemplary embodiment, herein described, however, assumes that the construction of the canned message occurs in conjunction with the use of a server.

In response to receiving the user-indication of a selected category, at step 3, the server may send a first set of canned message segments to the client device. For instance, if the user selected the Request category, the server may send a Request Category choice card 82 (FIG. 4). The Request Category choice card 82 may comprise a list of canned message segments (as choice-items) for constructing a canned message in the selected category, i.e., Request category. For example, the canned message segments in the Request category may include the requests "Meet me at", "Call me at", or "Pick up." The list of canned message segments may comprise the words or phrases for constructing a canned message in the selected category. Of course, the exemplary embodiment is not limited to the choice-items illustrated in FIG. 4. The choice card may comprise other choice-items and constructs other than lists (e.g., sets).

The user may select a first canned message segment from the first set of canned message segments. The selection may represent a word or phrase of a particular canned message. For example, in the Request Category choice card 82, the user may select the canned message segment "Meet me at" 84 from the choice items 80, "Meet me at", "Call me at", or "Pick up." The user may select the canned message segment 84 by pressing a numeric digit associated with the choice item or by scrolling the item under a highlight and pressing an OK softkey identified by a label 86. As noted above, however, the exemplary embodiment is not limited by the mechanism for identifying a particular choice-item.

Again, the selection may generate user-indication to the microbrowser indicating the user's selection. At step 4, the client device, may send the selected canned message segment to the server. The server may use the first canned message segment that the user selected to construct another set of canned message segments having canned message segments that grammatically continue the first canned message segment. For example, if the user selected the first canned message segment "Meet me at" 84 from the Request Category choice card 82, the server may construct a second set of canned message segments consisting of locations to meet such as "work", "home", or "school." At least one canned message segment of the second set of canned message segments (in conjunction with the first selected canned message segment 84) may grammatically continue the first canned message segment selected.

The server may follow grammar rules or grammar sets, for example, in constructing the second set of canned message segments. Grammar rules are typically rules of grammar that define how to combine words to make grammatically correct phrases. Grammar sets are typically bi-grams (pairs) or tri-grams (triplets) of words that may occur together in a language. The grammar rules or grammar sets may be used to facilitate construction of the set of canned message segments that best continue an earlier selected canned message segment.

For example, if a user selects the segment "its good to be" from a first set of canned message segments, grammar rules or sets may indicate that the phrases "home" and "happy" occur frequently with the phrase "its good to be" Therefore, the second set of canned message segments in the exemplary embodiment may include the choice-items "home" and "happy" as canned message segments of the second set. The second set of canned message segments preferably would not include the word "sad" since the word may not appear very frequently with the phrase "its good to be."

There are at least two advantages to using grammar rules and grammar sets. First, the use of grammar rules and grammar sets may assist the server in creating a proper grammatical continuation of an earlier selected canned message segment. Second, the grammar sets and grammar rules may be used to prioritize the list of canned message segments. The server may use grammar sets and grammar rules so that more probable grammatical continuations of a selected canned message segment may be listed at the top of a list of choice-items. From the user's perspective, a particular canned message segment may, thus, be found more quickly.

In an alternative embodiment of the present invention, the second set of canned message segments may already reside on the server (e.g., in memory). For example, at least one of the WML cards established and sent by the server may be a second set of canned message segments that comprise canned message segments that grammatically continue a first canned message segment selected. The processor on the server may retrieve an appropriate card based on the canned message segment that the user selected and transmit the card to the handheld device. Thus, the server need not have grammar rules or grammar sets programmed on the device.

Independently of how the server obtains the second set of canned message segments (e.g., by grammatical construction or retrieval from memory), at step 5, the server may transmit a choice card 88 to the handheld device. The choice card 88 may be encoded with the second set of canned message segments as choice-items. The microbrowser may then display the choice card 88 on the display screen. Again, the choice card 88 may be encoded such that a user may select a canned message segment from the second set of canned message segments.

When the microbrowser receives user-indication of a second canned message segment selected from the second set, at step 6, the microbrowser may send the selection to the server. The server may combine it with the first canned message segment and, at step 7, transmit a composite message to the client device. The composite message may define the canned message. Thus, if the first message segment that the user selected was "Meet me at" 84 and the second message segment that the user selected was "home" 90, the composite message that the server may send to the client device may be the composite "Meet me at home." Alternatively, the server may take some other action with respect to the combined message, without actually sending it to the client device.

The microbrowser may place the composite message in the text-entry field 94 of a text-entry card 92 or encode the composite message as a choice-item in a choice card. Furthermore, the composite of the canned message segment may include additional characters not within the canned message segments. For example, the composite may comprise formatting characters (e.g., quotation marks and punctuation), numbers, or alpha-numeric characters.

The server may further construct a third set of canned message segments that grammatically continues the composite of the first and second canned message segments. The server may transmit and the client device may receive the third set of canned message segments. The user may select a third canned message segment from the third set, and the server may construct a composite of the three canned message segments selected. The process of the server generating canned message segments grammatically continuing a composite of earlier selected canned message segments may continue until the user completes construction of the canned message or until otherwise desired. Thus, the exemplary embodiment may not be limited to the number of iterations necessary to complete construction of the canned message.

3. Canned Message Construction Using a Text Entry Card

The method of grammatically continuing an earlier canned message segment using grammar rules or grammar sets may not always produce every single possible grammatical continuation of an earlier selected canned message segment. Thus, in another exemplary embodiment of the present invention, the choice cards used during construction of the canned message may also be encoded with an EDIT function. The EDIT function may permit user-entry of a text-string. The text-string, as related to user-entry, may comprise words or phrases entered into the handheld device and/or edits to canned message segment(s) (including edits to composites).

In an exemplary embodiment of the present invention, the user may press an EDIT softkey (or select an EDIT choice-item) to invoke the EDIT function. Pressing the EDIT softkey may place the canned message segment (or composite of canned messages segments) selected so far in the text-entry field of a text card. The user may enter words or phrases and/or edit canned message segment(s) (including edits to composites) using conventional text-entry methods such as the triple-tap method, U.S. Pat. No. 4,825,464 entitled "Successive Key Operating Mechanism for Telephone Dialing," herein incorporated by reference. Other arrangements are also possible.

Figure 5:
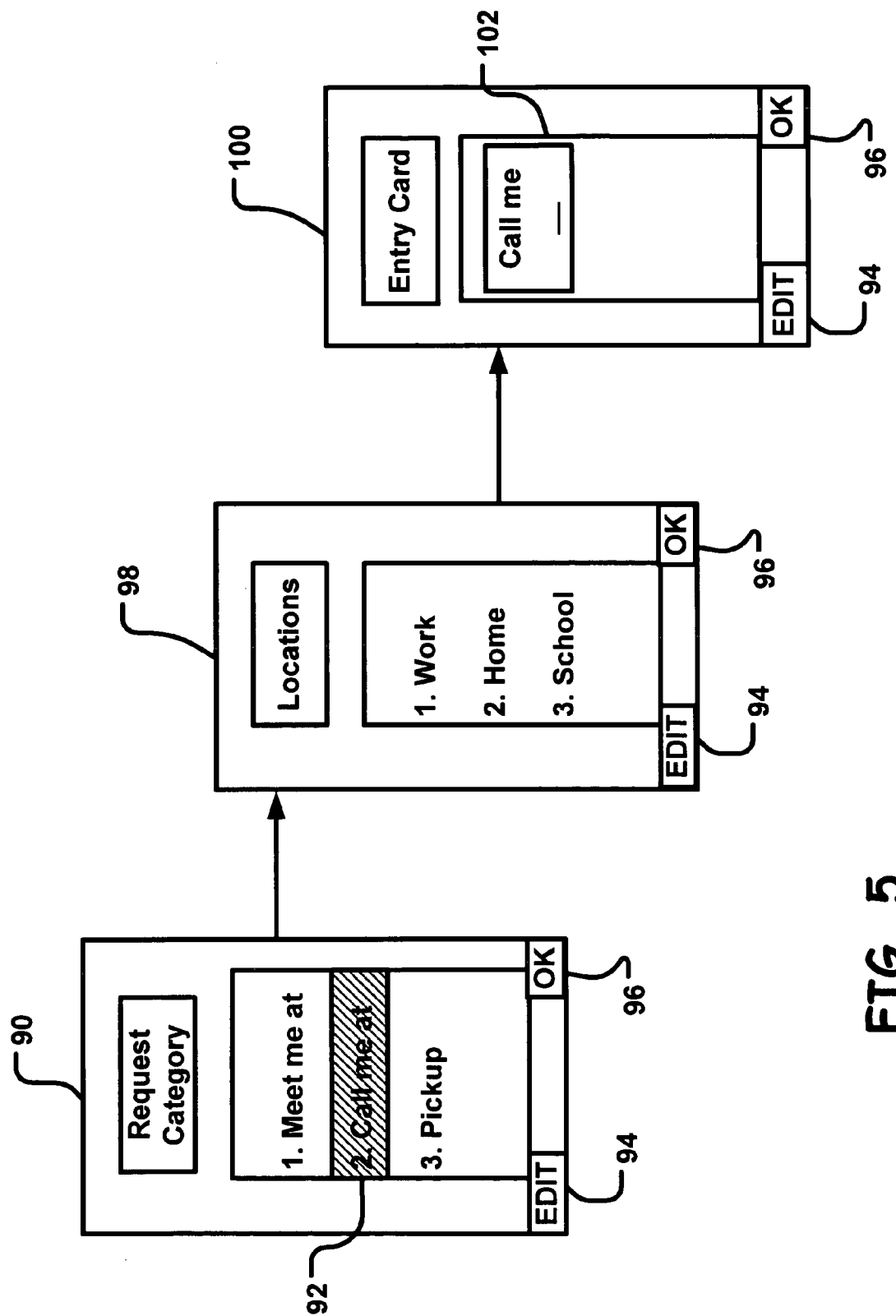
FIG. 5 illustrates choice cards (with EDIT softkey) as used during construction of canned messages.

FIG. 5 illustrates an exemplary embodiment of the EDIT function in the context of constructing a canned message in the Request Category. Although FIG. 5 illustrates construction of a canned message in the Request category, the exemplary embodiment is not limiting. The EDIT function may be invoked independently of the type of canned message to be constructed and regardless of whether card or non-card constructs are used in constructing a canned message. Furthermore, the EDIT function may be invoked at any time during the construction of the canned message.

As noted earlier, during the construction of a Request Category canned message, a first choice card 90 may have canned message segments such as "Meet me at", "Call me at", and "Pick up" as choice items. A second choice card 98 may be encoded with a second set of canned message segments where at least one choice-item in the second set may grammatically continue a first canned message segment. For example, "home" may grammatically continue the canned message segment "Call me at" 92 selected from the first set.

The choice card used during construction of a canned message may define an EDIT softkey identified by a label 94. If the first set of canned message segments or the second set of canned message segments does not have a particular canned message segment, the user may select the EDIT function.

Upon selecting the EDIT function (e.g. pressing a softkey), the server may transmit a text-entry card 100. The text-entry card 100 may be encoded with the composite message entered so far in the text-entry field 102. The user may then use the triple tap method, for example, to enter words or phrases in the text-entry field and/or edit canned message segment(s) (including edits to composites) in the text-entry field.

Upon completion of user-entry, the user may press an OK softkey as indicated by label 96, to indicate that user-entry is complete. The handheld device may then send the canned message segment to the server so that it may grammatically continue the entered canned message segment. Alternatively, the user may then press another softkey to indicate completed construction of the canned message.

The server may also store the text-string and include it as a choice item in subsequent choice cards.

4. Reducing Communications Between the Wireless Handheld Device and Server

In the above exemplary embodiments, the server and client device exchange cards during construction of the canned message. For example, the server may send a set of canned message segments encoded in a choice card in response to the user selecting canned message segments. Such a system may require the server and handheld device to exchange at least one card for every canned message segment selected.

According to an alternative exemplary embodiment of the present invention, the server may send the client device a deck of cards. The deck of cards may comprise some or a portion of the cards to construct a canned message in one or more categories. The client device may store the deck of cards in its memory 28 (FIG. 2), but other arrangements are also possible.

Figure 6:
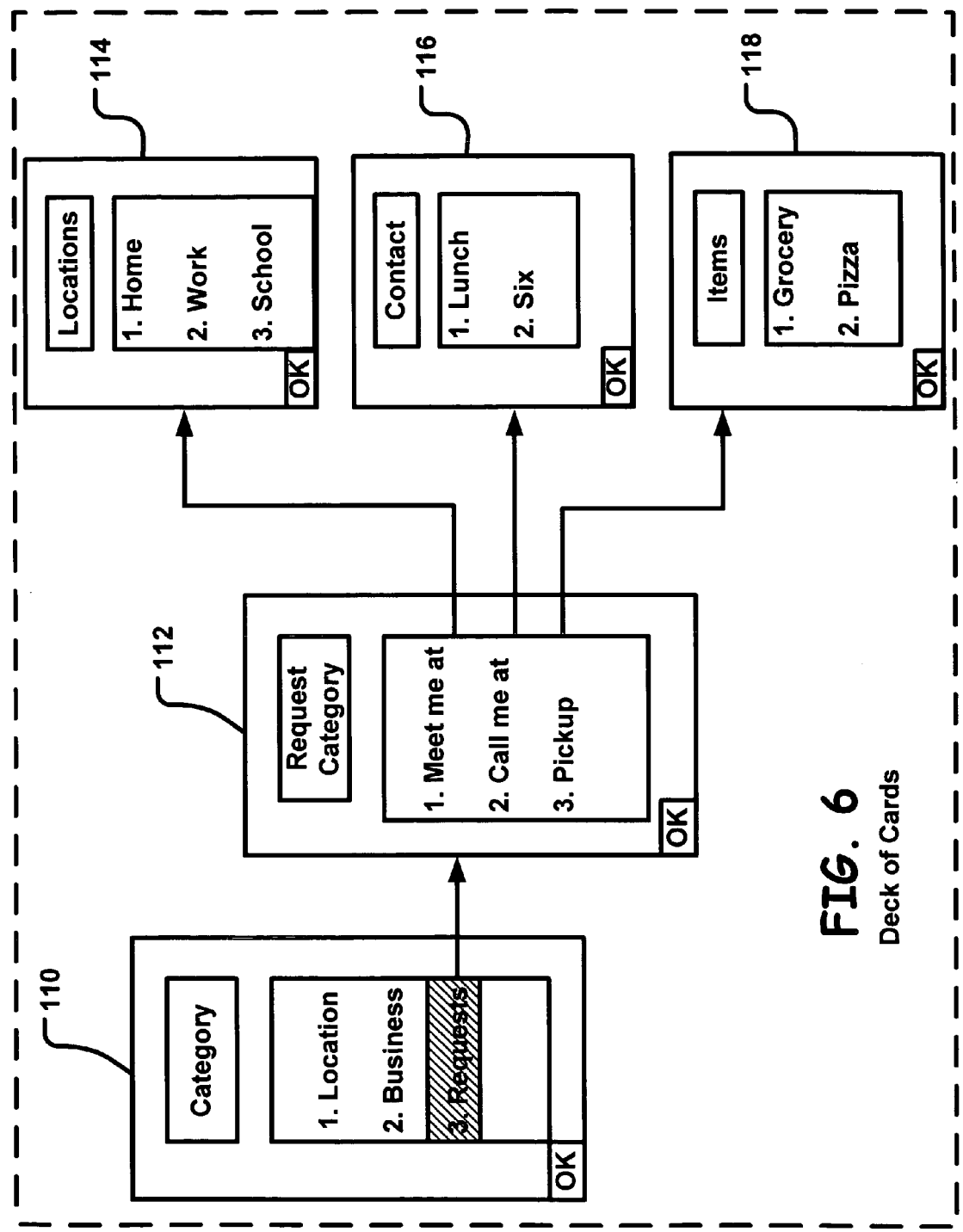
FIG. 6 illustrates a deck of cards as used during construction of a canned message.

FIG. 6 illustrates an exemplary deck of cards as used in accordance with an exemplary embodiment of the present invention. The exemplary deck of cards are choice cards with specific canned message segments as choice-items. The exemplary embodiment does not necessarily limit the specific canned message segments that make up the deck of cards. The purpose of FIG. 6 is only to illustrate one example of a deck of cards that may aid in reducing server/client communications during construction of a canned message.

The deck of cards may comprise choice cards encoded with all or a portion of the possible canned message segments. For example, it may include a Category choice card 110 and a Request Category choice card 112. The Request Category choice card may be encoded with a first set of canned message segment. The deck of cards may also include at least one second set of canned message segments (e.g., Location Category choice card 114, Contact Category choice card 116, and Items Category choice card 118) that each comprise canned message segments that grammatically continue a canned message segment in the first set of canned message segments.

Each of these cards may be the same card as transmitted by a server during construction of a canned message. In the present exemplary embodiment, however, the server need not send the card as the user requests it. Instead, the microbrowser may retrieve the appropriate card from memory as needed.

For example, the choice card 112 comprising a set of canned message segment in the Request Category may have canned message segments that are linked to other choice cards. Thus, if the first canned message segment "Meet me at" is selected from the choice card, the microbrowser may retrieve the Locations choice card 114 from memory. The Locations choice card 114 may have at least one canned message segment that grammatically continues the first canned message segment selected. Thus, the server and client device may not have to exchange cards as often as if the cards had resided on the server.

Exemplary embodiments of the present invention have been illustrated and described. It will be understood, however, that changes and modifications may be made to the embodiment as described without deviating from the spirit and scope of the invention as defined by the following claims.

I claim:

1. A method comprising:
    displaying a first set of canned message segments on a display screen;
    receiving user-indication identifying a first canned message segment selected from the first set of canned message segments;
    providing an option of editing the first canned message to the user;
    constructing a second set of canned message segments based on the first canned message segment, the second set having at least one canned message segment grammatically continuing the first canned message segment;
    displaying the second set of canned message segments on the display screen;
    receiving user-indication identifying a second canned message segment selected from the second set of canned message segments;
    providing an option of editing the second canned message to the user;
    concatenating at least the first and second canned message segments so as to create a composite canned message, wherein the composite canned message includes the first and second canned message segments; and
    sending the composite canned message to a message recipient.

2. The method of claim 1, wherein displaying each set of canned message segments comprises displaying a choice card, the choice card having each canned message segment of each set being encoded as a respective choice-item of the choice card.

3. A network-based method comprising:
    a first entity sending a first set of canned message segments to a second entity;
    the second entity receiving user-indication identifying a first canned message segment selected from the first set of canned message segments and providing an option of editing the first set of canned message segments to the user;
    the first entity constructing a second set of canned message segments based on the first canned message segment, the second set having at least one canned message segment grammatically continuing the first canned message segment;
    the first entity sending the second set of canned message segments to the second entity; and
    the second entity (i) receiving user-indication identifying a second canned message segment selected from the second set of canned message segments and providing an option of editing the second set of canned message segments to the user; (ii) concatenating at least the first and second canned message segments so as to create a composite canned message, wherein the composite canned message includes the first and second canned message segments, and (iii) sending the composite canned message to a message recipient.

4. A network-based method comprising:
    a first entity receiving user-entry of a text-string; and
    a second entity (i) constructing a set of canned message segments based on the text-string, the set having at least one canned message segment grammatically continuing the text-sting, and providing an option of editing the set of canned message segments to the user, (ii) sending the set of canned message segments to the first entity, (iii) concatenating at least the text-string and a canned message segment selected from the set of canned messages so as to create a composite canned message, wherein the composite canned message includes the text-sting and the canned message segment, and (iv) sending the composite canned message to a message recipient.

5. The network-based method of claim 4, wherein the first entity receiving the user-entry further comprises the first entity receiving the text-string as entered in a text-entry field of the text-entry card.

6. A system comprising:
    a processor;
    memory;
    a display screen;
    computer instructions stored in the memory and executable by the processor to perform functions including;
        (i) displaying a first set of canned message segments on a display screen;
        (ii) constructing a second set of canned message segments based on a first canned message segment, the second set having at least one canned message segment grammatically continuing the first canned message segment; and
        (iii) displaying the second set of canned message segments on the display screen; and
    at least one actuator for:
        (i) selecting the first canned message segment from the first set of canned message segments; and
        (ii) selecting the second canned message segment from the second set of canned message segments; and
    computer instructions stored in the memory and executable by the processor for performing functions including:
        (i) providing an option of editing the first and second canned message segments to the user;
        (ii) concatenating at least the first and second canned message segments so as to create a composite canned message, wherein the composite canned message includes the first and second canned message segments; and
        (iii) sending the composite canned message to a message recipient.

7. The system of claim 6, wherein a choice card is displayed on the display screen, the choice card having each canned message segment of each set being encoded as a respective choice-item of the choice card.

8. The system of claim 7, wherein the choice card is encoded in a markup language.

9. The system of claim 8, wherein the markup language is selected from the group consisting of WML, HDML, and cHTML.

10. The system of claim 6, wherein a deck of cards is stored in the memory, the deck of cards defining the first set of canned messages and the second set of canned messages.

11. The system of claim 6 further comprising computer instructions stored in the memory and executable by the processor for constructing the second set of canned message segments according to at least one grammar set.

12. The system of claim 6 further comprising computer instructions stored in the memory and executable by the processor for constructing the second set of canned message segments according to at least one grammar rule.

13. The system of claim 6, wherein the processor executes microbrowser software, the microbrowser software comprising computer instructions for displaying each set of canned message segments on the display screen.

14. A system comprising:
a processor,
memory;
a display screen;
a character-input device for performing user-entry of a text-string; and
computer instructions stored in the memory and executable by the processor for:
constructing a set of canned message segments based on the text-string, the set having at least one canned message segment grammatically continuing the text-string;
displaying the set of canned message segments on the display screen;
providing an option of editing the set of canned message segments to the user;
concatenating at least the text-string and a canned message segment selected from the set of canned message segments so as to create a composite canned message, wherein the composite canned message includes the text-string and the canned message segment; and
sending the composite canned message to a message recipient.

15. The system of claim 14 further comprising computer instructions stored in memory and executable by the processor for performing triple-tap functionality on the character-input device.

16. The system of claim 14 further comprising computer instructions stored in memory and executable by the processor for displaying a text-entry card, wherein the text-string is entered in a text-entry field of the text-entry card.

17. A server comprising:
a processor,
memory;
computer instructions stored in the memory and executable by the processor for:
constructing a second set of canned message segments based on a first canned message segment, the second set having at least one canned message segment grammatically continuing the first canned message segment;
outputting the second set of canned message segments;
receiving an indication of a second canned message segment selected from the second set of canned message segments;
providing an option of editing the first and second sets of canned message segments to the user;
concatenating at least the second canned message segment with the first canned message segment so as to create a composite canned message, wherein the composite canned message includes the first canned message segment and the second canned message segment; and
sending the composite canned message to a message recipient.

18. The server of claim 17, wherein each canned message segment of the second set of canned message segments is encoded as a respective choice-item of a choice card.

19. The server of claim 18, wherein the choice card is encoded in a markup language.

20. The server of claim 19, wherein the markup language is selected from the group consisting of WML, HDML, and cHTML.

21. The server of claim 17 further comprising computer instructions stored in the memory and executable by the processor for constructing the second set of canned message segments according to at least one grammar rule.

22. The server of claim 17 further comprising computer instructions stored in the memory and executable by the processor for constructing the second set of canned message segments according to at least one grammar set.

23. The server of claim 17 further comprising the processor receiving at least one canned message segment from the memory, the at least one canned message segment grammatically continuing the first canned message segment.

24. A network-based system comprising:
a first entity displaying a first set of canned message segments on a display screen;
the first entity receiving user-indication identifying a first canned message segment selected from the first set of canned message segments;
providing an option of editing the first set of canned message segments to the user;
a second entity constructing a second set of canned message segments based on the first canned message segment, the second set having at least one canned message segment grammatically continuing the first canned message segment;
providing an option of editing the second set of canned message segments to the user;
the second entity sending the second set of canned message segments to the first entity;
the first entity displaying the second set of canned message segments on the display screen;
the first entity receiving user-indication identifying a second canned message segment from the second set of canned message segments; and
the first entity concatenating at least the first and second canned message segments so as to create a composite canned message, wherein the composite canned message includes the first and second canned message segments, and sending the composite canned message to a message recipient.

* * * * *